US011029737B2

(12) United States Patent
Chen et al.

(10) Patent No.: US 11,029,737 B2
(45) Date of Patent: Jun. 8, 2021

(54) PARTITIONING MEMBER, HARD DISK FIXING MECHANISM AND SERVER

(71) Applicant: CHENBRO MICOM CO., LTD., New Taipei (TW)

(72) Inventors: Hsin-Hung Chen, New Taipei (TW); Pao-Lung Wang, New Taipei (TW); Fenb Chang, New Taipei (TW)

(73) Assignee: CHENBRO MICOM CO., LTD., New Taipei (TW)

( * ) Notice: Subject to any disclaimer, the term of this patent is extended or adjusted under 35 U.S.C. 154(b) by 43 days.

(21) Appl. No.: 16/706,861

(22) Filed: Dec. 9, 2019

(65) Prior Publication Data

US 2020/0183466 A1 Jun. 11, 2020

(30) Foreign Application Priority Data

Dec. 11, 2018 (CN) .......................... 201822072894.1

(51) Int. Cl.
*G06F 1/18* (2006.01)
*G11B 33/12* (2006.01)

(52) U.S. Cl.
CPC ............ *G06F 1/187* (2013.01); *G11B 33/124* (2013.01)

(58) Field of Classification Search
CPC .................................................... G06F 1/187
See application file for complete search history.

(56) References Cited

U.S. PATENT DOCUMENTS 3,807,572 A * 4/1974 Luvara ............... A47B 87/0246
211/10
6,724,641 B1 * 4/2004 Hwang ................ G02B 6/4277
361/818

FOREIGN PATENT DOCUMENTS

| TW | I419637 B | 12/2013 |
| TW | M474163 U | 3/2014 |
| TW | M537779 U | 3/2017 |

* cited by examiner

*Primary Examiner* — Jerry Wu
(74) *Attorney, Agent, or Firm* — CKC & Partners Co., LLC (57) ABSTRACT

A hard disk fixing mechanism includes a casing, a partitioning member, a fixing feature, a plurality of studs and a number of position-limiting slots. The casing has two plates. The partitioning member is connected to the plates to define two accommodating areas for accommodating hard disks. These studs are respectively located on the plates. These position-limiting slots are respectively formed on two opposite sides of the partitioning member so that the studs are removably buckled on the position-limiting slots. The fixing feature is able to fix the partitioning member to the casing to prevent the studs from being disengaged from the position-limiting slots.

16 Claims, 11 Drawing Sheets

PARTITIONING MEMBER, HARD DISK FIXING MECHANISM AND SERVER

CROSS-REFERENCE TO RELATED APPLICATION

This application claims priority to China Application Serial Number 201822072894.1, filed Dec. 11, 2018, which is herein incorporated by reference.

BACKGROUND

Field of Disclosure

The present disclosure relates to a partitioning member, and in particular to a partitioning member of a hard disk fixing mechanism and a server with the hard disk fixing mechanism.

Description of Related Art

Due to the increasing demand for data storage, a housing of a server can be loaded with a large number of data access devices, so as to enable the server to provide information access services to the outside world through the data access devices. Taking a rack server as an example, for example, the data access device includes a tray and a hard disk installed on the tray. The trays are disposed in the housing abreast.

However, as the hard disks with different specifications also need to be matched with trays with different widths, it needs to disassemble or install the housing through tools when the data access device is installed, maintained or replaced, which is quite inconvenient.

Therefore, how to develop a solution to improve the foregoing deficiencies and inconvenience is an important issue that relevant persons engaged in the industry are currently unable to delay.

SUMMARY

The present disclosure provides a partitioning member, a hard disk fixing mechanism, and a server to solve the problems of the prior art.

According to one embodiment of the present disclosure, the hard disk fixing mechanism includes a casing, a partitioning member, a fixing feature, a first stud, a second stud, a first position-limiting slot, and a second position-limiting slot. The casing has a first plate and a second plate. There is a separation space between the first plate and the second plate. The first stud is located on the first plate. The second stud is located on the second plate. The partitioning member is connected to the first plate and the second plate and divides the separation space into two accommodating areas. Each of the accommodating areas is used for accommodating a hard disk. The first position-limiting slot and the second position-limiting slot are respectively formed on two opposite sides of the partitioning member so that the first stud and the second stud are removably buckled on the position-limiting slots. The fixing feature fixes the partitioning member to the casing to prevent the first stud from being disengaged from the first position-limiting slot and prevent the second stud from being disengaged from the second position-limiting slot.

In this way, through the architecture of the foregoing embodiment, not only the assembly of the hard disk fixing mechanism is improved when a data access device is installed, maintained or replaced, but also hard disks of different sizes can be achieved, thereby providing services of hard disks of different sizes.

In one or more embodiments, in the foregoing hard disk fixing mechanism, the first position-limiting slot includes a first groove and a first inlet, and the first inlet is communicated with the first groove. The second position-limiting slot includes a second groove and a second inlet, and the second inlet is communicated with the second groove. In this way, the fixing feature starts to fix the partitioning member to the casing when the first stud enters the first groove from the first inlet, the second stud enters the second groove from the second inlet, and both the first stud and the second stud synchronously slide away from the first inlet and the second inlet in a first axial direction.

In one or more embodiments, in the foregoing hard disk fixing mechanism, the partitioning member includes an elongated body, a first side plate, and a second side plate. The elongated body is located between the first plate and the second plate and located between the accommodating areas. The first side plate and the second side plate respectively transversely extend from two opposite long sides of the elongated body, and are respectively connected to the first plate and the second plate. The first groove penetrates through the first side plate, the first inlet is disposed at an edge of the first side plate, the second groove penetrates through the second side plate, and the second inlet is disposed at an edge of the second side plate.

In one or more embodiments, in the foregoing hard disk fixing mechanism, the partitioning member includes two supporting ribs. The supporting ribs are respectively convexly disposed on two opposite sides of the elongated body for respectively supporting the hard disks in the accommodating areas, and the supporting ribs are respectively integrally connected to the elongated body.

In one or more embodiments, in the foregoing hard disk fixing mechanism, each of the supporting ribs is linear or elliptical.

In one or more embodiments, in the foregoing hard disk fixing mechanism, the casing further has a locating hole formed on one surface of the second plate facing the first plate. The partitioning member further includes a concave portion and a spring piece. The concave portion is located on the second side plate and the elongated body. The spring piece is located in the concave portion, one end of the spring piece is connected to the second side plate, and the other end is a free end. The fixing feature includes a locating pin convexly disposed on the spring piece. Therefore, when the first stud and the second stud synchronously slide in the first axial direction, the locating pin is inserted in the locating hole in a second axial direction, and the second axial direction is orthogonal to the first axial direction.

In one or more embodiments, in the foregoing hard disk fixing mechanism, the partitioning member further includes a pull handle that is connected to the free end of the spring piece. In this way, when the spring piece is pulled through the pull handle to drive the locating pin to be disengaged from the locating hole, the first stud can be disengaged from the first position-limiting slot, and the second stud can be disengaged from the second position-limiting slot.

In one or more embodiments, in the foregoing hard disk fixing mechanism, the casing further has a front blocking piece, the front blocking piece is connected to a side of the second plate and extends in a direction towards the first plate, and the front blocking piece has a linear gap. The partitioning member further includes a limiting piece located on a short side of the elongated body and disposed between the first side plate and the second side plate. In this way, when the first stud and the second stud synchronously slide in the first axial direction, the limiting piece oppositely moves into the linear gap and is limited to be positioned in the linear gap.

In one or more embodiments, in the foregoing hard disk fixing mechanism, the first side plate and the second side plate respectively transversely extend in a same direction on the elongated body.

In one or more embodiments, in the foregoing hard disk fixing mechanism, the first inlet is formed at a junction of the elongated body and the first side plate, and the second inlet is formed at a junction of the elongated body and the second side plate.

In one or more embodiments, in the foregoing hard disk fixing mechanism, the fixing feature includes a plurality of fixing bolts. In this way, the partitioning member can be fixed to the casing through these fixing bolts when the first stud and the second stud synchronously slide away from the first inlet and the second inlet.

In one or more embodiments, in the foregoing hard disk fixing mechanism, the first inlet is formed at a junction of the elongated body and the first side plate, and the second inlet is formed at an edge of the second side plate facing away from the elongated body.

In one or more embodiments, in the foregoing hard disk fixing mechanism, the first side plate and the second side plate respectively transversely extend in two opposite directions on the elongated body.

In one or more embodiments, in the foregoing hard disk fixing mechanism, the casing includes a first cover body and a second cover body, the second cover body overlaps the first cover body such that the separation space is formed between the first cover body and the second cover body, and the partitioning member is fixedly connected to the first cover body and the second cover body.

According to one embodiment of the present disclosure, a partitioning member includes an elongated body, a first side plate, a second side plate, a first position-limiting slot, a second position-limiting slot, a concave portion, a spring piece, and a locating pin. The first side plate and the second side plate are respectively formed by bending two opposite long sides of the elongated body. The first position-limiting slot includes a first groove and a first inlet. The first groove penetrates through the first side plate, the first inlet is communicated with the first groove and disposed at an edge of the first side plate. The second position-limiting slot includes a second groove and a second inlet. The second groove penetrates through the second side plate, and the second inlet is communicated with the second groove and disposed at an edge of the second side plate. The concave portion is located on the second side plate. The spring piece is located in the concave portion, one end of the spring piece is connected to the second side plate, and the other end is a free end. The locating pin is convexly disposed on the spring piece facing away from the first side plate.

In one or more embodiments, the foregoing partitioning member further includes a pull handle. The pull handle is connected to the free end of the spring piece, located in the concave portion, and used for being linkage with the locating pin.

In one or more embodiments, in the foregoing partitioning member, the first side plate and the second side plate respectively transversely extend in a same direction or two opposite directions on the elongated body.

In one or more embodiments, in the foregoing partitioning member, the first inlet is formed at a junction of the elongated body and the first side plate, and the second inlet is formed at a junction of the elongated body and the second side plate.

In one or more embodiments, in the foregoing partitioning member, the first inlet is formed at a junction of the elongated body and the first side plate, and the second inlet is formed at an edge of the second side plate facing away from the elongated body.

According to an embodiment of the present disclosure, a server includes a housing, two hard disks, and a hard disk fixing mechanism. The hard disk fixing mechanism includes a casing, a partitioning member, a plurality of studs, a plurality of position-limiting slots, and at least one fixing feature. The casing is locked on the housing and has two plates. There is a separation space between the plates. The partitioning member is connected to the plates and divides the separation space into two accommodating areas, and each of the accommodating areas accommodates one of the hard disks. The studs are respectively located on the plates. The position-limiting slots are respectively formed on two opposite sides of the partitioning member so that the studs are removably buckled on the position-limiting slots. Each of the position-limiting slots includes a groove and an inlet, and the inlet is communicated with the groove. In this way, when the studs respectively enter the corresponding grooves from the inlets and synchronously slide away from the inlets, the fixing feature fixes the partitioning member to the casing to prevent the studs from being disengaged from the corresponding position-limiting slots.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

In order that the foregoing and other objectives, features, advantages and embodiments of the present disclosure can be more clearly understood, the accompanying drawings are described as follows.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
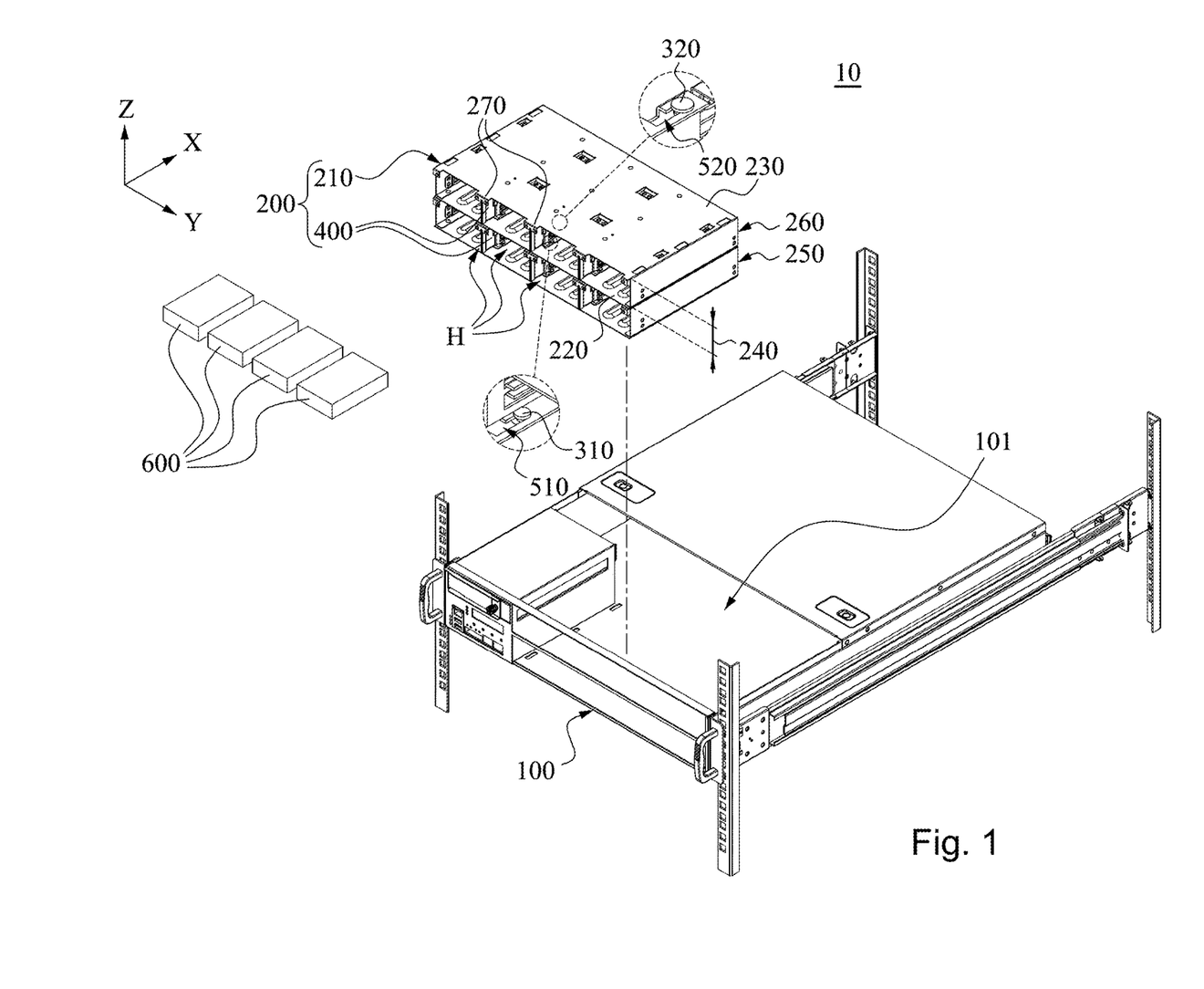
FIG. 1 is a partial exploded view of a server and a hard disk fixing mechanism according to an embodiment of the present disclosure.
Figure 2A:
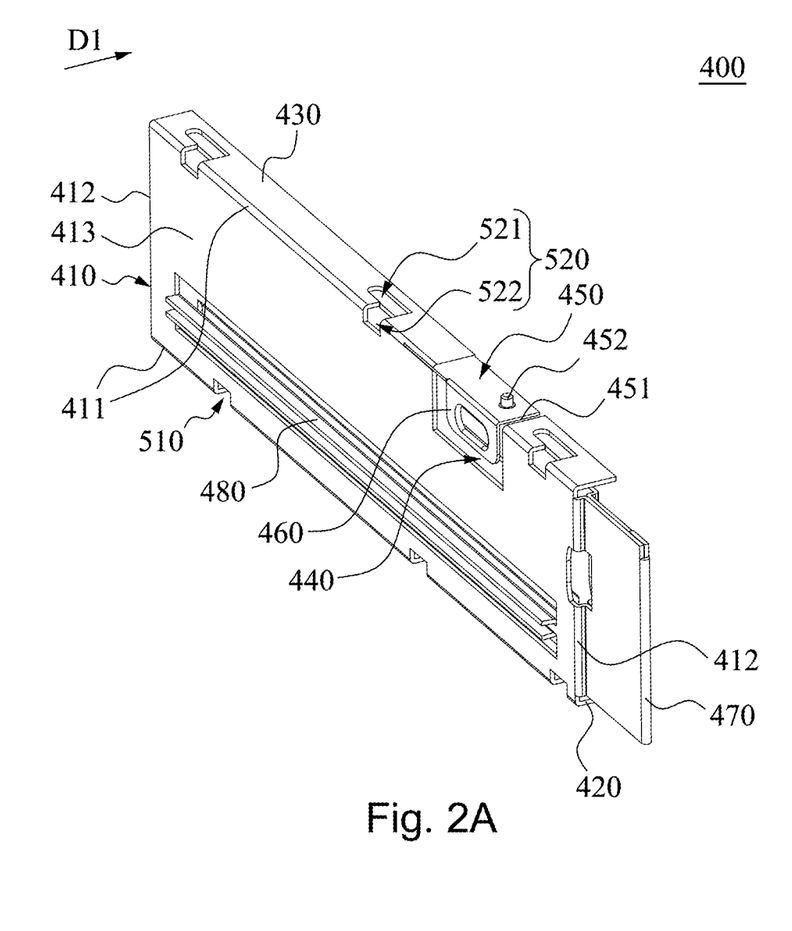
FIG. 2A is a perspective view of a partitioning member according to an embodiment of the present disclosure.
Figure 2B:
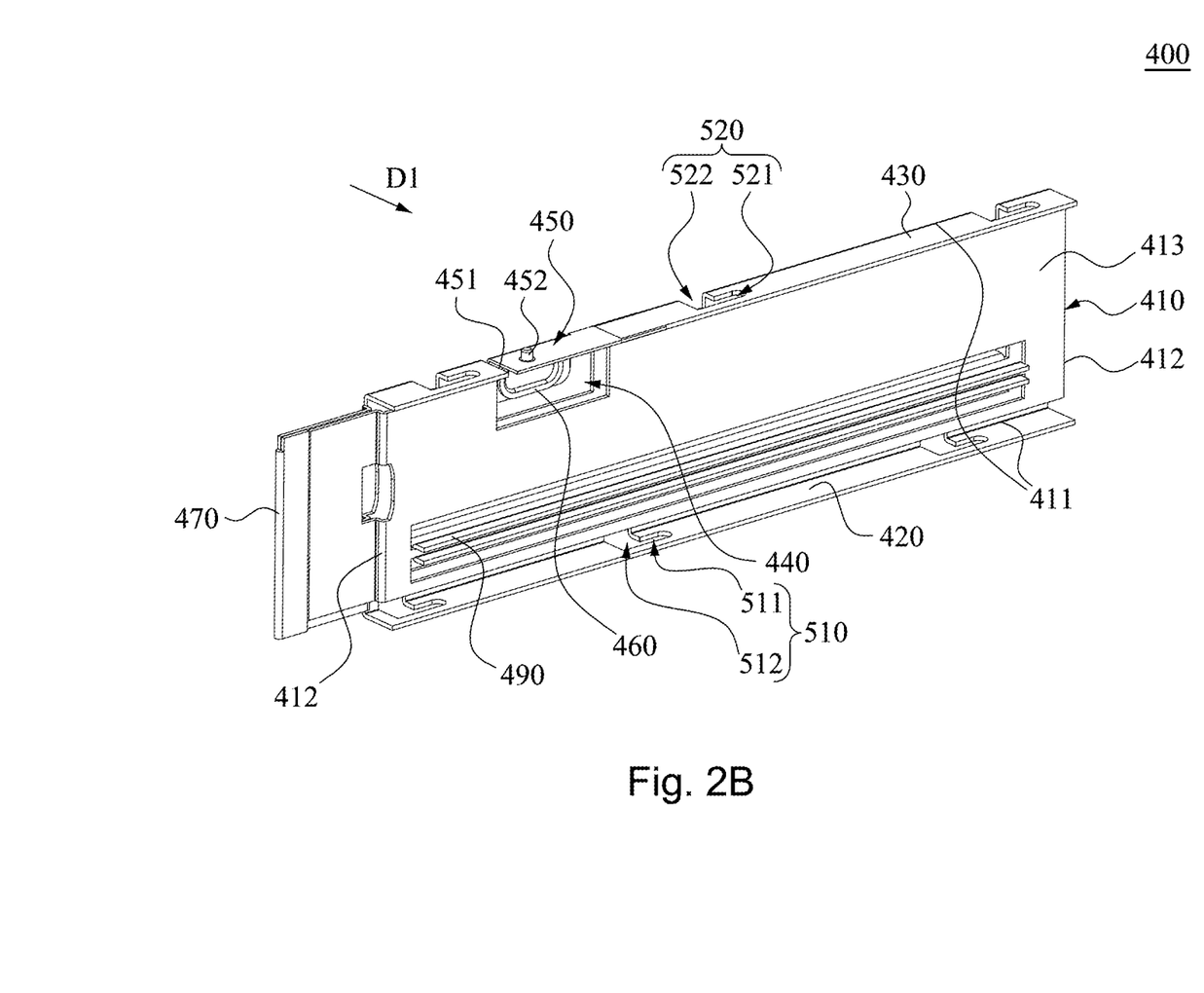
FIG. 2B is a perspective view of the partitioning member of FIG. 2A from another viewing angle.

Reference is now made to FIG. 1 to FIG. 2B, in which FIG. 1 is a partial exploded view of a server 10 and a hard disk fixing mechanism 200 according to an embodiment of the present disclosure. FIG. 2A is a perspective view of a partitioning member 400 according to an embodiment of the present disclosure. FIG. 2B is a perspective view of the partitioning member 400 of FIG. 2A from another viewing angle. As shown in FIGS. 1 to 2B, in this embodiment, the server 10 includes a housing 100, a hard disk fixing mechanism 200, and a plurality of hard disks 600. The housing 100 has an internal space 101. The hard disk fixing mechanism 200 is located in the internal space 101 and fixed to the housing 100. The hard disk fixing mechanism 200 includes a casing 210 and a plurality of partitioning members 400. The casing 210 includes at least a first plate 220 and a second plate 230 parallel to each other. There is a separation space 240 between the first plate 220 and the second plate 230. The partitioning members 400 are clamped between the first plate 220 and the second plate 230 and disposed in the separation space 240 at intervals and divide the separation space 240 into a plurality of accommodating areas H, and thus the hard disks 600 can be respectively accommodated in the accommodating areas H. For example, the hard disks 600 enter and exit the accommodating areas H in a first axial direction (such as an X axis). Each of the partitioning members 400 is respectively connected to the first plate 220 and the second plate 230 in a second axial direction (such as a Z axis). The hard disk fixing mechanism 200 further includes a plurality of first studs 310 and a plurality of second studs 320. The first studs 310 are distributed on one surface of the first plate 220 facing towards the second plate 230. The second studs 320 are distributed on one surface of the second plate 230 facing towards the first plate 220. Two opposite sides of each of the partitioning members 400 are respectively provided with a plurality of first position-limiting slots 510 and second position-limiting slots 520. In this way, the first studs 310 are removably buckled on the first position-limiting slots 510, the second studs 320 are removably buckled on the second position-limiting slots 520, and each of the partitioning members 400 is fixedly connected to the first plate 220 and the second plate 230.

In this way, by adjusting the distribution of the first studs 310 and the second studs 320, the number and positions of the partitioning member 400 can be adaptively adjusted corresponding to the number or sizes of the hard disks 600, so as to load the hard disks 600 of different sizes, thereby providing services of the hard disks 600 of different sizes. In addition, when a data access device is installed, maintained or replaced, since the partitioning members 400 can be quickly disassembled or assembled without tools, the assembly of the hard disk fixing mechanism 200 can also be improved.

Figure 3A:
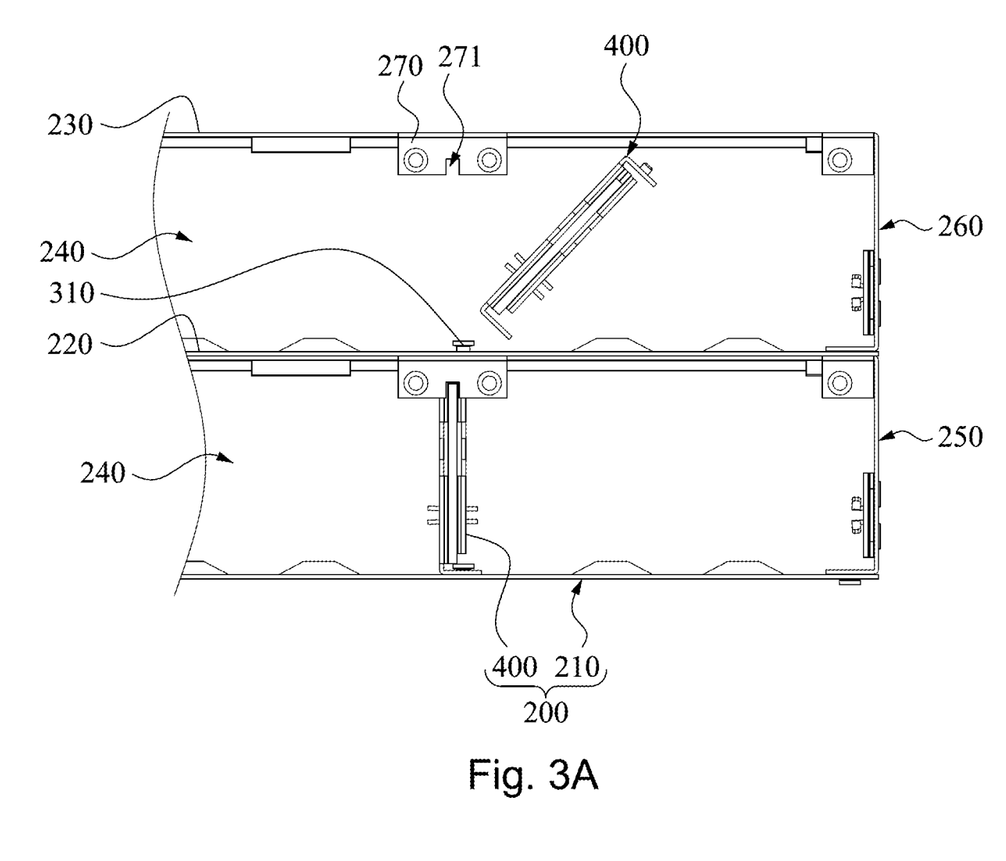
FIGS. 3A to 3C are schematic views of a continuous operation of mounting the partitioning member of FIG. 2B into a casing.

More specifically, in this embodiment, as shown in FIG. 3A, the casing 210 further has a plurality of front blocking pieces 270. The front blocking pieces 270 are disposed on the second plate 230 at intervals. Each of the front blocking pieces 270 is connected to a side of the second plate 230, and extends in a direction (such as a Z axis) of the first plate 220. The front blocking pieces 270 each has a linear gap 271. The linear gap 271 faces towards the separation space 240.

Each of the partitioning members 400 includes an elongated body 410, a first side plate 420, and a second side plate 430. The elongated body 410 has two opposite long sides 411 and two opposite short sides 412. Each of the long sides 411 is located between the two short sides 412 and adjacent to the two short sides 412. Each of the short sides 412 is located between the two long sides 411 and adjacent to the two long sides 411. The first side plate 420 and the second side plate 430 respectively transversely extend from the two opposite long sides 411 of the elongated body 410, and are respectively connected to the first plate 220 and the second plate 230. For example, the elongated body 410 has a long axis direction. The long axis direction is parallel to the first axial direction (such as the X axis), and the first side plate 420 and the second side plate 430 respectively transversely extend from the two long sides 411 of the elongated body 410 in a same direction (such as a direction D1). The first position-limiting slot 510 includes a first groove 511 and a first inlet 512, and the first inlet 512 is communicated with the first groove 511. The first groove 511 penetrates through the first side plate 420, and the first inlet 512 is disposed at an edge of the first side plate 420. More specifically, the first inlet 512 is formed at a junction of the elongated body 410 and the first side plate 420. The second position-limiting slot 520 includes a second groove 521 and a second inlet 522, and the second inlet 522 is communicated with the second groove 521. The second groove 521 penetrates through the second side plate 430, and the second inlet 522 is disposed at an edge of the second side plate 430. More specifically, the second inlet 522 is formed at a junction of the elongated body 410 and the second side plate 430.

In addition, each of the partitioning members 400 further includes a concave portion 440, a spring piece 450, and a pull handle 460. The concave portion 440 is located on the second side plate 430 and part of the elongated body 410. The spring piece 450 is located in the concave portion 440, one end of the spring piece 450 is connected to the second side plate 430, and the other end is a free end 451. The pull handle 460 is connected to the spring piece 450. Preferably, the pull handle 460 is connected to the free end 451 of the spring piece 450. However, the present disclosure is not limited to the pull handle 460 having to be connected to the free end 451 of the spring piece 450. A locating pin 452 is convexly disposed on one surface of the spring piece 450 facing away from the first side plate 420. In this way, with the spring piece 450, the locating pin 452 can be linked with the pull handle 460. In addition, each of the partitioning members 400 further includes a limiting piece 470, and the limiting piece 470 is located on one of the short sides 412 of the elongated body 410 and disposed between the first side plate 420 and the second side plate 430.

The partitioning members 400 each include a first supporting rib 480 and a second supporting rib 490. The first supporting rib 480 and the second supporting rib 490 are respectively convexly disposed on two opposite surfaces 413 of the elongated body 410, and used for respectively supporting each of the hard disks 600 located in the accommodating region H. For example, the first supporting rib 480 and the second supporting rib 490 are convex ribs respectively completed by a stamping process, so the first supporting rib 480 and the second supporting rib 490 are respectively integrally connected to the two opposite surfaces 413 of the elongated body 410. In addition, the first supporting rib 480 and the second supporting rib 490 are linear respectively. However, the present disclosure is not limited to the shape of the supporting ribs.

Furthermore, the casing 210 has a first cover body 250 and a second cover body 260. The first cover body 250 is overlapped between the second cover body 260 and the housing 100 so that the two separation spaces 240 overlap each other inside the casing 210. A plurality of (such as 3) partitioning members 400 are disposed in each of the separation spaces 240. Some of the partitioning members 400 are located in the upper separation space 240 and are fixedly connected to the first cover body 250 and the second cover body 260. Some other partitioning members 400 are located in the lower separation space 240 and are fixedly connected to the housing 100 and the first cover body 250.

Figure 3B:
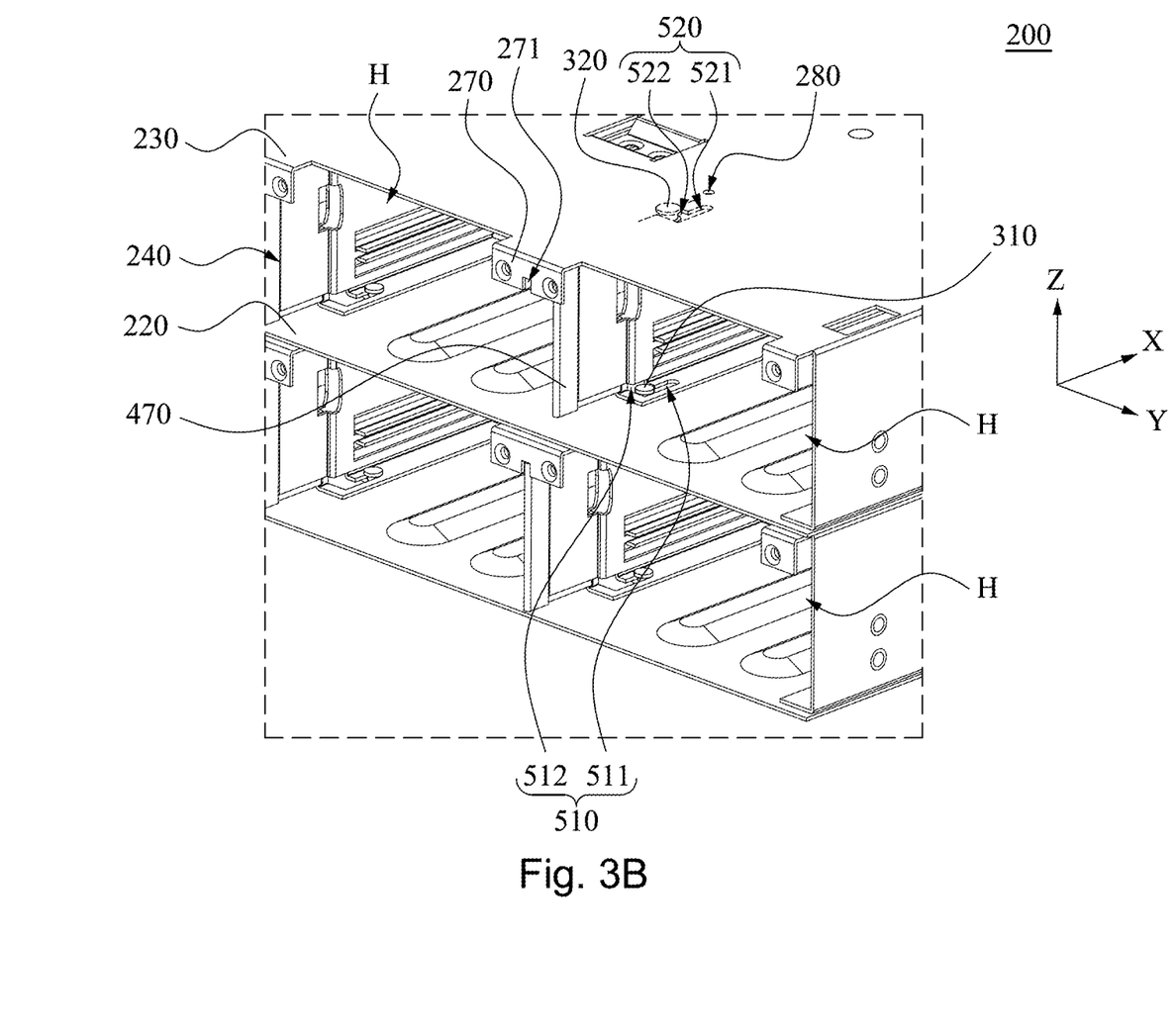
Figure 3C:
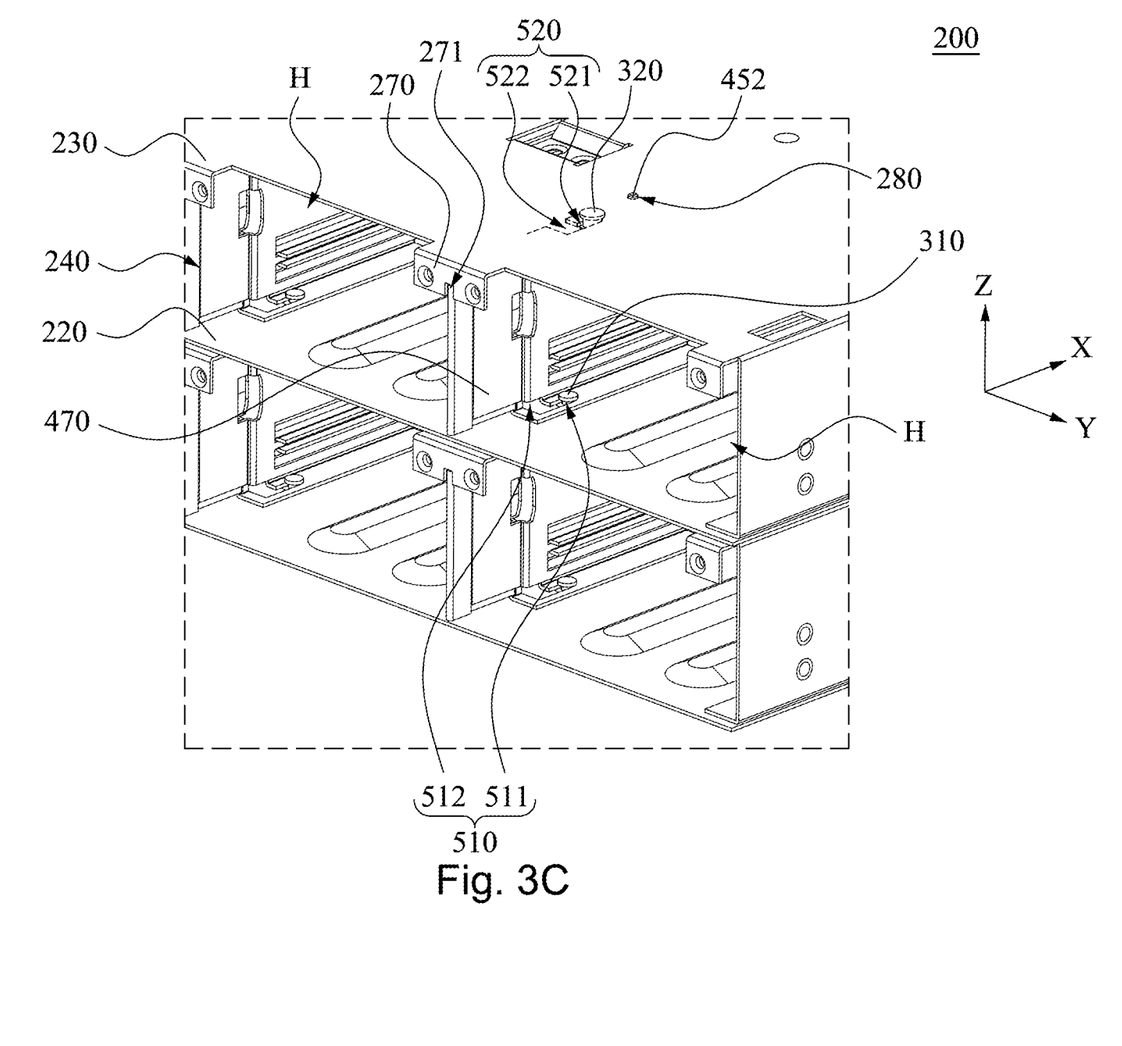

FIGS. 3A to 3C are schematic views of a continuous operation of mounting the partitioning member 400 of FIG. 2B into a casing 210. When a user wants to install one of the partitioning members 400 into the casing 210, as shown in FIG. 3A, the user first slantly places the partitioning member 400 into the separation space 240, so that the first studs 310 of the first plate 220 can be subsequently respectively moved into the corresponding first position-limiting slots 510 of the partitioning member 400. Next, the first studs 310 on the first plate 220 enter the first groove 511 along a Y axis from the first inlet 512. Next, as shown in FIG. 3B, the partitioning member 400 is corrected so that the second studs 320 on the second plate 230 can enter the second groove 521 from the second inlet 522. Next, as shown in FIGS. 3B and 3C, the partitioning member 400 is pulled along the first axial direction (such as the X axis), so that the limiting piece 470 of the partitioning member 400 enters the linear gap 271 in a direction of the front blocking piece 270 and is limited to be located in the linear gap 271. At the same time, the first studs 310 and the second studs 320 relatively synchronously slide away from the first inlet 512 and the second inlet 522 in the first axial direction (such as the X axis) (FIG. 3C), and the locating pin 452 is inserted into a locating hole 280 of the second side plate 430 in the second axial direction (such as the Z axis). When the first studs 310 and the second studs 320 move synchronously to the final positioning, the locating pin 452 starts to be inserted into the locating hole 280 of the second side plate 430, which not only prevents the first studs 310 from being disengaged from the first position-limiting slots 510 and prevent the second studs 320 from being disengaged from the second position-limiting slots 520, but also prevents the limiting piece 470 from being disengaged from the linear gap 271 of the front blocking piece 270. That is, the locating pin 452 inserted into the locating hole 280 enables the partitioning member 400 to be three-dimensionally fixed to the casing 210.

However, the present disclosure is not limited to this. The way of inserting the foregoing locating pin 452 into the locating hole 280 is only one of the fixing features of the present disclosure. Those with ordinary knowledge in the field of the present disclosure can also arbitrarily select suitable fixing features according to specific requirements or restrictions.

Figure 4:
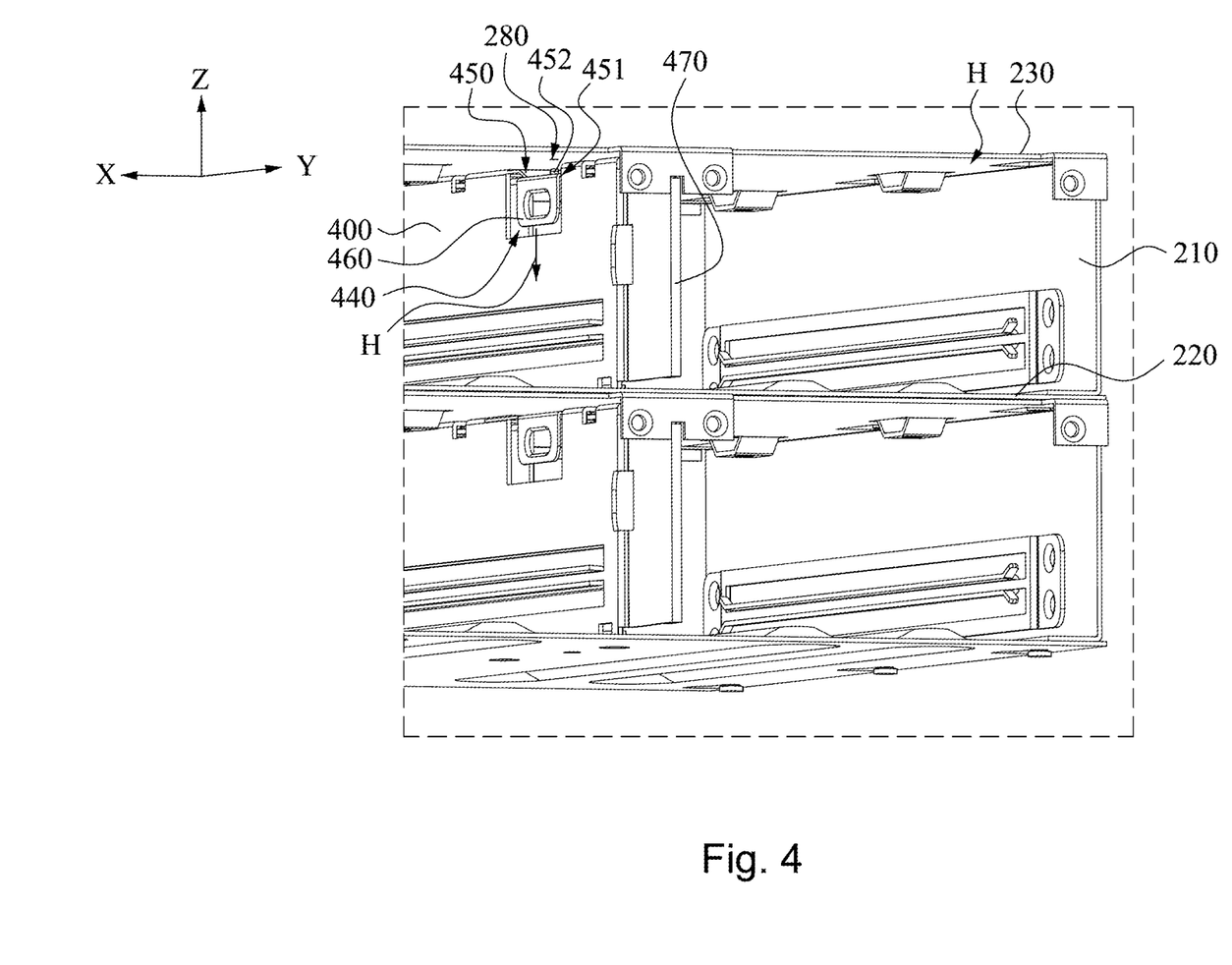
FIG. 4 is an operational schematic view of disassembling the partitioning member of FIG. 2B from the casing.

On the other hand, FIG. 4 is an operational schematic view of disassembling the partitioning member 400 of FIG. 2B from the casing 210. As shown in FIG. 4, when the user wants to disassemble the partitioning member 400, the user pulls the spring piece 450 downward (such as in a direction H) through the pull handle 460, so that the locating pin 452 is driven away from the locating hole 280, and thus the partitioning member 400 is no longer three-dimensionally fixed to the casing 210. Next, as shown in FIG. 3B, the user pushes the partitioning member 400 away from the linear gap 271 of the front blocking piece 270 in the X axis, so that the first studs 310 slide into the first inlet 512 in the first groove 511 and the second studs 320 slide into the second inlet 522 in the second groove 521. Next, as shown in FIG. 3A, the first studs 310 and the second studs 320 synchronously slide out of the first position-limiting slots 510 and the second position-limiting slots 520 (as shown in FIG. 3B) by tilting the partitioning member 400, thereby allowing the partitioning member 400 to be disengaged from the casing 210.

Figure 5:
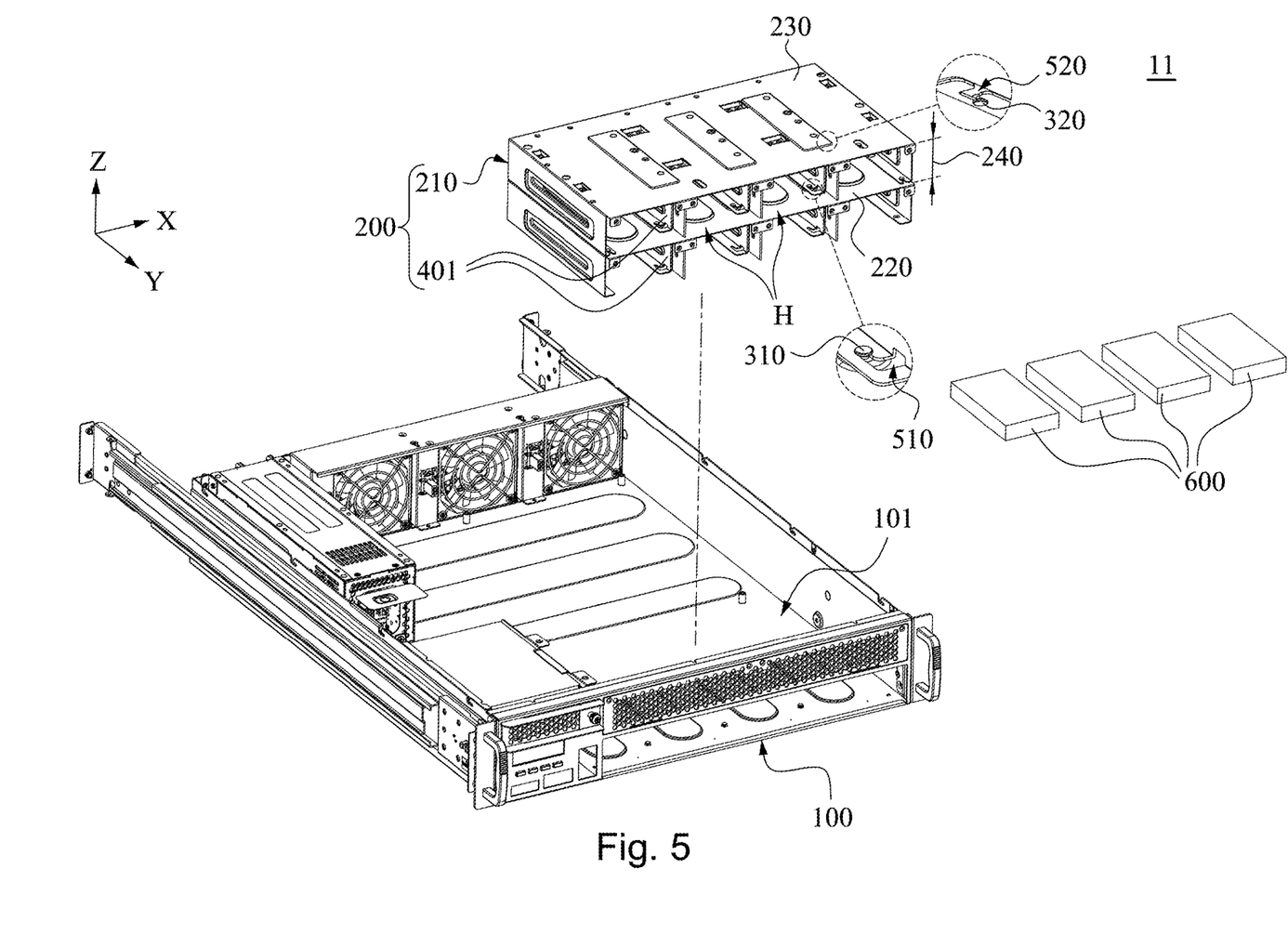
FIG. 5 is a partial exploded view of a server and a hard disk fixing mechanism according to an embodiment of the present disclosure.
Figure 6:
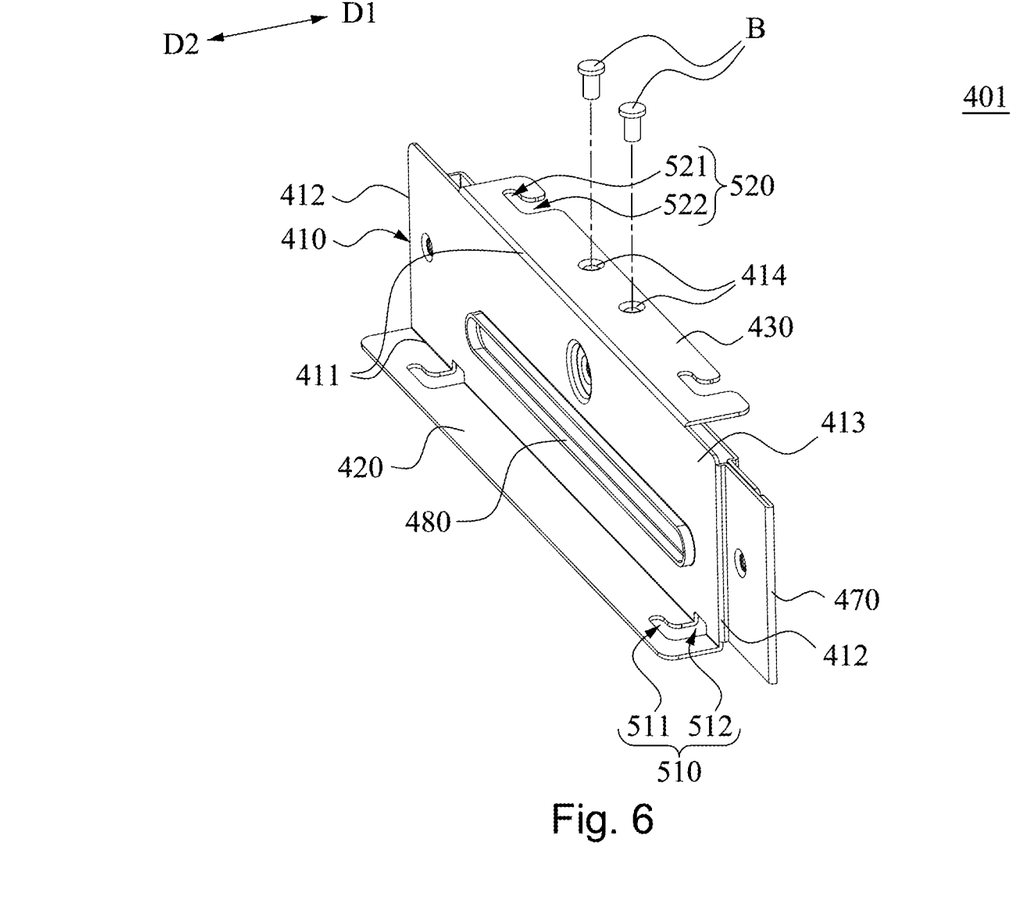
FIG. 6 is a perspective view of a partitioning member according to an embodiment of the present disclosure.
Figure 7:
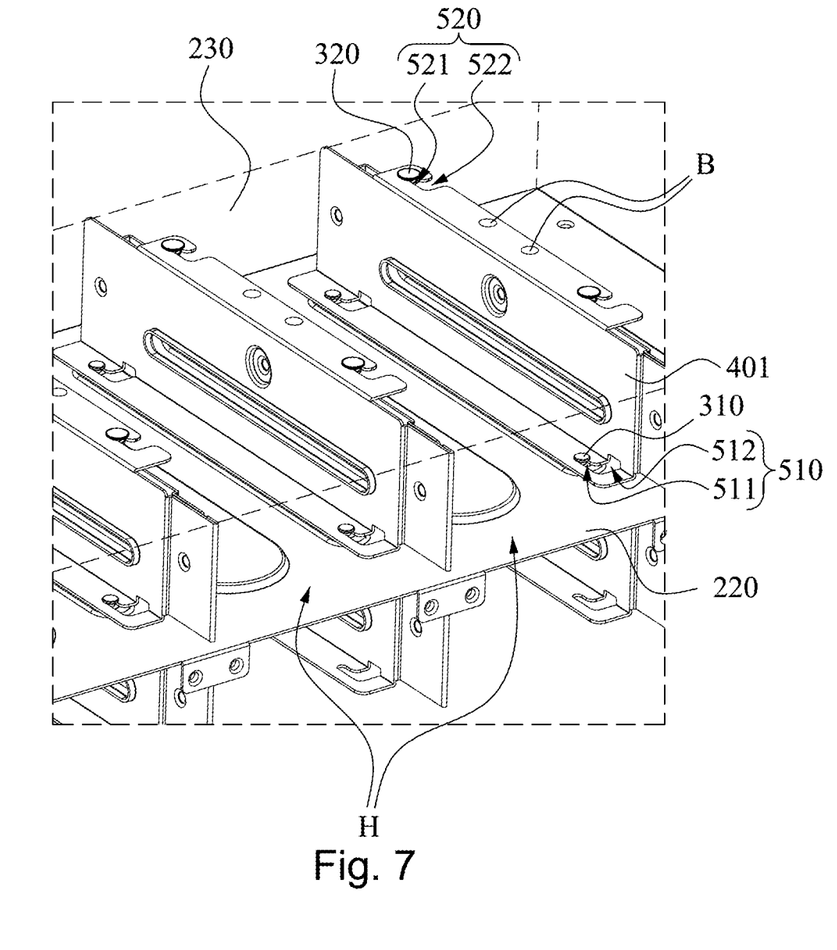
FIG. 7 is an operational schematic view of the partitioning member of FIG. 6 into a casing.

Reference is now made to FIG. 5 to FIG. 7, in which FIG. 5 is a partial exploded view of a server 11 and a hard disk fixing mechanism 200 according to an embodiment of the present disclosure. FIG. 6 is a perspective view of a partitioning member 400 according to an embodiment of the present disclosure. FIG. 7 is an operational schematic view of the partitioning member 401 of FIG. 6 into a casing 210. As shown in FIG. 5 to FIG. 7, the partitioning member 401 of FIG. 6 is substantially the same as the partitioning member 400 of FIG. 2A. One of the differences is that, in this embodiment, the foregoing partitioning member 401 does not have a spring piece, a locating pin and a pull handle, but is fixed to the casing 210 by causing a bolt B to pass through a screw hole 414. However, the present disclosure is not limited to this, as long as the partitioning member 401 can be three-dimensionally fixed to the casing 210. The way of fixing to the casing 210 through the bolt B is only one of the fixing features of the present disclosure. Those with ordinary skills in the field of the present disclosure can also arbitrarily select suitable fixing features according to specific requirements or restrictions.

In addition, in this embodiment, the first inlet 512 of the foregoing first position-limiting slot 510 is formed at a junction of the elongated body 410 and the first side plate 420, and the second inlet 522 of the foregoing second position-limiting slot 520 is formed at an edge of the second side plate 430 facing away from the elongated body 410. The first side plate 420 and the second side plate 430 respectively transversely extend from two long sides 411 of the elongated body 410 in two opposite directions (such as directions D1 and D2) on the elongated body 410. Furthermore, the first supporting rib 480 and the second supporting rib 490 are elliptical respectively. However, the present disclosure is not limited to the shape of the supporting ribs.

Figure 8:
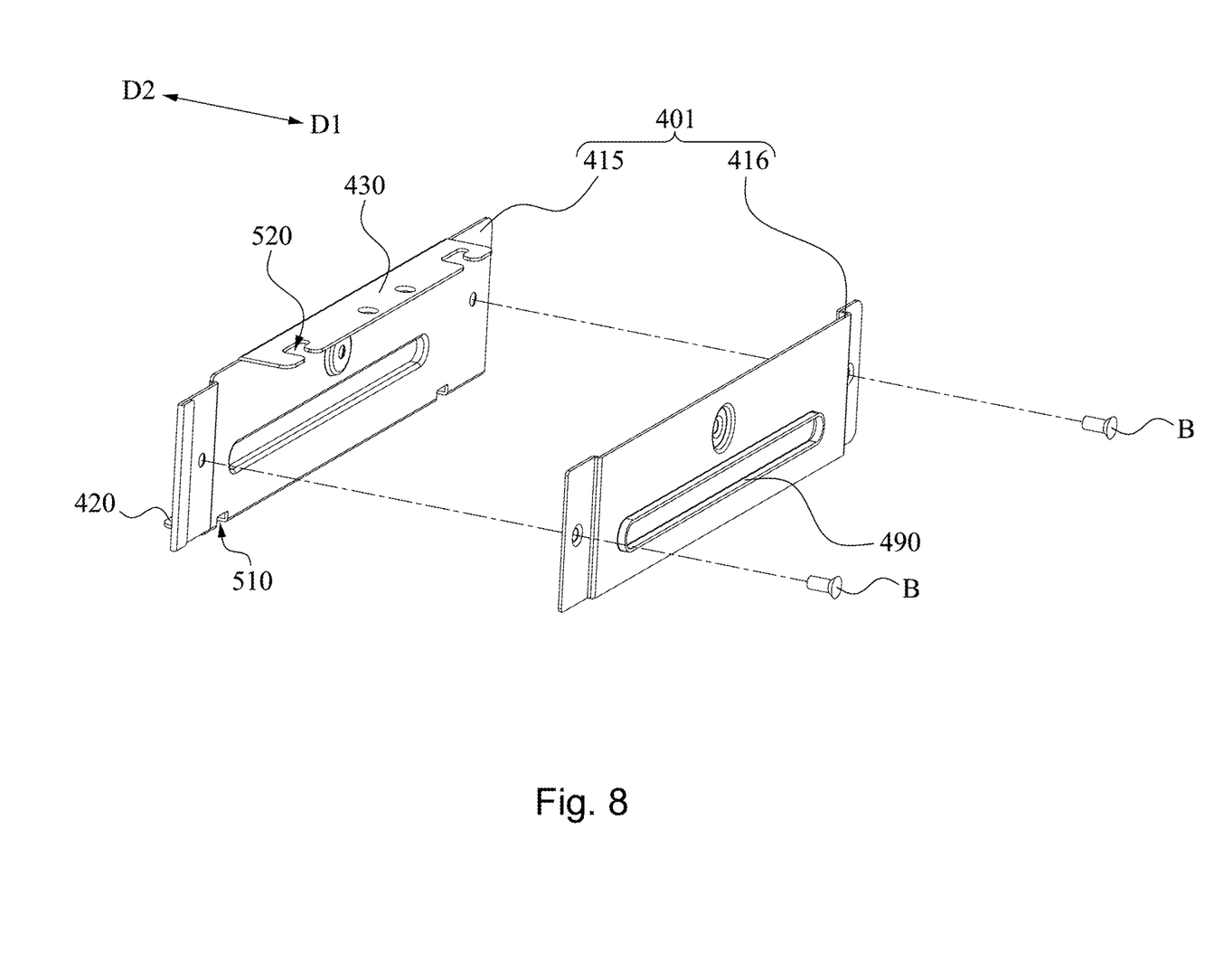
FIG. 8 is an exploded view of the partitioning member of FIG. 6.

FIG. 8 is an exploded view of the partitioning member 401 of FIG. 6. In this embodiment, as shown in FIG. 8, the foregoing partitioning member 401 includes a first component 415 and a second component 416. The first side plate 420 and the second side plate 430 are respectively disposed on two opposite sides of the first component 415, and the second component 416 overlaps the first component 415 to form the foregoing elongated body 410 (FIG. 6). For example, the second component 416 and the first component 415 are locked to each other as a whole through a bolt B.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A hard disk fixing mechanism, comprising: a casing having a first plate and a second plate, wherein a separation space is formed between the first plate and the second plate; a first stud located on the first plate; a second stud located on the second plate; a partitioning member connected to the first plate and the second plate so as to divide the separation space into two accommodating areas, wherein each of the accommodating areas is capable of accommodating a hard disk; a first side plate and a second side plate respectively formed by bending two opposite long sides of an elongated body of the partitioning member; a first position-limiting slot and a second position-limiting slot that are respectively formed on the first and second side plates of the partitioning member so that the first stud and the second stud are removably buckled on the position-limiting slots; and a fixing feature used to fix the partitioning member to the casing so as to block the first stud from being disengaged from the first position-limiting slot, and block the second stud from being disengaged from the second position-limiting slot; and the first position-limiting slot comprises a first groove and a first inlet, and the first inlet is communicated with the first groove; and the second position-limiting slot comprises a second groove and a second inlet, and the second inlet is communicated with the second groove, wherein the fixing feature fixes the partitioning member to the casing when the first stud enters the first groove from the first inlet, the second stud enters the second groove from the second inlet, and both the first stud and the second stud synchronously slide away from the first inlet and the second inlet in a first axial direction; and wherein the first groove penetrates through the first side plate, the first inlet is disposed at an edge of the first side plate, the second groove penetrates through the second side plate, and the second inlet is disposed at an edge of the second side plate.

2. The hard disk fixing mechanism of claim 1, wherein the partitioning member comprises:
    two supporting ribs respectively convexly disposed on two opposite sides of the elongated body for respectively supporting the hard disk, wherein the supporting ribs are respectively integrally connected to the elongated body.

3. The hard disk fixing mechanism of claim 2, wherein each of the supporting ribs is linear or elliptical.

4. The hard disk fixing mechanism of claim 1, wherein the casing further has a locating hole formed on one surface of the second plate facing towards the first plate; and
    the partitioning member further comprises a concave portion and a spring piece, the concave portion is located on the second side plate and the elongated body, the spring piece is located in the concave portion, one end of the spring piece is connected to the second side plate, the other end of the spring piece is a free end, and the fixing feature comprises a locating pin convexly disposed on the spring piece,
    wherein when the first stud and the second stud synchronously slide in the first axial direction, the locating pin is inserted in the locating hole in a second axial direction, wherein the second axial direction is orthogonal to the first axial direction.

5. The hard disk fixing mechanism of claim 4, wherein the partitioning member further comprises a pull handle that is connected to the free end of the spring piece,
    wherein when the spring piece is pulled through the pull handle to drive the locating pin to be disengaged from the locating hole, the first stud is allowed to be disengaged from the first position-limiting slot, and the second stud is allowed to be disengaged from the second position-limiting slot.

6. The hard disk fixing mechanism of claim 1, wherein the casing further is provided with a front blocking piece that is connected to a side of the second plate, and extends in a direction of the first plate, and the front blocking piece is formed with a linear gap; and
    the partitioning member further comprises a limiting piece that is located on a short side of the elongated body and disposed between the first side plate and the second side plate,
    wherein when the first stud and the second stud synchronously slide in the first axial direction, the limiting piece relatively moves into the linear gap and is limited to be positioned in the linear gap.

7. The hard disk fixing mechanism of claim 1, wherein the first side plate and the second side plate respectively transversely extend in a same direction on the elongated body.

8. The hard disk fixing mechanism of claim 1, wherein the first inlet is formed at a junction of the elongated body and the first side plate, and the second inlet is formed at a junction of the elongated body and the second side plate.

9. The hard disk fixing mechanism of claim 1, wherein the fixing feature comprises a plurality of fixing bolts,
    wherein the partitioning member is able to be fixed to the casing through the fixing bolts when the first stud and the second stud synchronously slide away from the first inlet and the second inlet.

10. The hard disk fixing mechanism of claim 1, wherein the first inlet is formed at a junction of the elongated body and the first side plate, and the second inlet is formed at an edge of the second side plate facing away from the elongated body.

11. The hard disk fixing mechanism of claim 1, wherein the first side plate and the second side plate respectively transversely extend in two opposite directions on the elongated body.

12. The hard disk fixing mechanism of claim 1, wherein the casing comprises a first cover body and a second cover body, the second cover body overlaps the first cover body such that the separation space is formed between the first cover body and the second cover body, and the partitioning member is fixedly connected to the first cover body and the second cover body.

13. A partitioning member, comprising: an elongated body; a first side plate and a second side plate respectively formed by bending two opposite long sides of the elongated body; a first position-limiting slot comprising a first groove and a first inlet, wherein the first groove penetrates through the first side plate, and the first inlet is communicated with the first groove and disposed at an edge of the first side plate; a second position-limiting slot comprises a second groove and a second inlet, wherein the second groove penetrates through the second side plate, and the second inlet is communicated with the second groove and disposed at an edge of the second side plate; a concave portion located on the second side plate; a spring piece located in the concave portion, wherein one end of the spring piece is connected to the second side plate, and the other end is a free end; and a locating pin convexly disposed on the spring piece facing away from the first side plate; the partitioning member connected to a first plate and a second plate of a casing so as to divide a separation space into two accommodating areas; and a locating hole formed on one surface of the second plate; a pull handle that is connected to the free end of the spring piece, located in the concave portion, and used for being linkage with the locating pin to be engage or disengage the locating hole.

14. The partitioning member of claim 13, wherein the first side plate and the second side plate respectively transversely extend in a same direction or two opposite directions on the elongated body.

15. The partitioning member of claim 13, wherein the first inlet is formed at a junction of the elongated body and the first side plate, and the second inlet is formed at a junction of the elongated body and the second side plate.

16. The partitioning member of claim 13, wherein the first inlet is formed at a junction of the elongated body and the first side plate, and the second inlet is formed at an edge of the second side plate facing away from the elongated body.

* * * * *